United States Patent [19]
Bolliger et al.

[11] Patent Number: 5,969,679
[45] Date of Patent: Oct. 19, 1999

[54] METHOD AND APPARATUS FOR DETERMINING WHETHER A WIRELESS STATION IS OPERATING WITHIN A PRESCRIBED GEOGRAPHIC REGION

[75] Inventors: Brian David Bolliger, Naperville; Jeffrey Ross Light, Lincolnwood; Mark Kevin Stockert, Winfield; Charles Varvaro, Glendale Heights, all of Ill.

[73] Assignee: Lucent Technologies Inc., Murray Hill, N.J.

[21] Appl. No.: 09/108,336

[22] Filed: Jun. 30, 1998

[51] Int. Cl.⁶ .................................................. G01S 3/02
[52] U.S. Cl. ................................................... 342/464
[58] Field of Search ..................................... 342/457, 464

[56] References Cited

U.S. PATENT DOCUMENTS 5,646,632   7/1997   Khan ........................................ 342/375

Primary Examiner—Thomas H. Tarcza
Assistant Examiner—Devin Drummond
Attorney, Agent, or Firm—Jeffrey M. Weinick

[57] ABSTRACT

A method and apparatus for determining whether a wireless station is operating within a prescribed geographic location. During an initialization process, the wireless telephone measures propagation delays of pilot signals from nearby base stations and stores the propagation delays in a non-volatile memory of the wireless station. Thereafter, during a check process, the wireless station measures propagation delays of pilot signals from nearby base stations and compares them with the stored propagation delays stored in memory. If the difference between the two sets of propagation delays are within a predetermined tolerance, then a determination is made that the wireless station is operating within the prescribed geographic location. Multiple sets of propagation delays may be stored in memory such that a determination can be made as to whether the mobile station is operating within any one of a number of prescribed geographic locations.

17 Claims, 2 Drawing Sheets

5,969,679

METHOD AND APPARATUS FOR DETERMINING WHETHER A WIRELESS STATION IS OPERATING WITHIN A PRESCRIBED GEOGRAPHIC REGION

FIELD OF THE INVENTION

The present invention relates generally to wireless communications. More particularly, the present invention relates to determining whether a wireless station is operating within a prescribed geographic location.

BACKGROUND OF THE INVENTION

Wireless telephones are well known in the art. In general, such telephones are mobile stations such that a user may use the telephone for communication anywhere within a particular geographic serving area. Continuous communication is provided even as the telephone moves about within the serving area. Such continuous service is provided in wireless cellular networks by providing radio base stations (RBS) throughout the geographic serving area. Each base station provides service to a geographic area, called a cell. As a mobile station moves from one cell to another, continuous service is provided by "handing off" the mobile station from one cell to another. In order to provide service to a large number of users, sophisticated frequency sharing plans must be used. The architecture and operation of such cellular wireless systems are well known in the art and will not be described in detail herein.

More recently, the notion of fixed wireless access has become of interest in the area of wireless communications. In a fixed wireless access system, wireless stations (e.g. wireless telephones), are provided with service from a wireless network. However, the wireless stations are expected to be fixed in a prescribed geographic location (e.g., a subscriber's home). In a fixed wireless system, service can be provided to more subscribers with less system resources because no system resources need to be spent on mobility tracking and handoff procedures. Further, since the location of fixed wireless stations are known, the available frequency spectrum can be used more efficiently because interference between users can be better managed.

Thus, service may be provided to fixed wireless subscribers at a lower cost as compared to the equivalent mobile wireless subscriber. A problem arises in that a given wireless telephone may be able to obtain service from a service provider in both a mobile wireless capacity and a fixed wireless capacity. From the service provider point of view, this is a problem because the service provider wants to differentiate fixed wireless service from mobile wireless service. This differentiation may be made on the basis of cost or the types of services provided. Thus, a fixed wireless subscriber should be limited to using the wireless system at the subscriber's fixed location. Alternatively, the fixed wireless subscriber should have to pay a higher rate when using the wireless telephone as a mobile telephone outside of the subscriber's fixed location.

In order for a service provider to handle these situations, the location of the wireless station must be known. There are several existing techniques for determining the location of a mobile station. For example, in several known techniques, the location of a mobile station can be determined by first computing the mobile stations distance from at least three base stations, and then using triangulation to compute the geographic location of the mobile station. For example, U.S. Pat. No. 5,646,632 discloses a technique for use in a code division multiple access (CDMA) system in which a mobile station can identify its own location using time delays of pilot signals received from nearby base stations.

SUMMARY OF THE INVENTION

We have recognized that while it is important to determine whether the wireless station is operating within a prescribed geographic location, it is not necessary to determine the actual geographic location of the wireless terminal. In accordance with the invention, a determination as to whether the wireless station is operating within a prescribed geographic region is made with reference to propagation delays of pilot signals transmitted by base stations. The actual geographic location of the wireless station is not determined, thus saving processing resources over the prior art techniques.

In accordance with the invention, a wireless station receives pilot signals from nearby base stations during a check process and computes time delays between the expected time of receipt and the actual time of receipt of the pilot signals. These time delays are determined with reference to the pilot signal from a chosen one of the base stations, called the reference base station. The time delays are compared with prestored time delays stored in a memory of the wireless station. If the computed time delays are within a predetermined tolerance of the stored time delays, a determination is made that the wireless station is operating within the prescribed geographic area. The time delays stored in the memory of the wireless station are computed during an initialization process in which the wireless station is operating within the prescribed geographic location.

In accordance with one aspect of the invention, the comparison between the time delays computed during the check process and the time delays stored during the initialization process is made by comparing the differences between the time delays of pilot signals of pairs of base stations.

In accordance with another aspect of the invention, a determination is made as to which one of a plurality of prescribed geographic locations the wireless station is operating within by comparing the time delays computed during the check process and a plurality of sets of time delays, each set being associated with one of the plurality of prescribed geographic locations.

These and other advantages of the invention will be apparent to those of ordinary skill in the art by reference to the following detailed description and the accompanying drawings.

DETAILED DESCRIPTION

Figure 1:
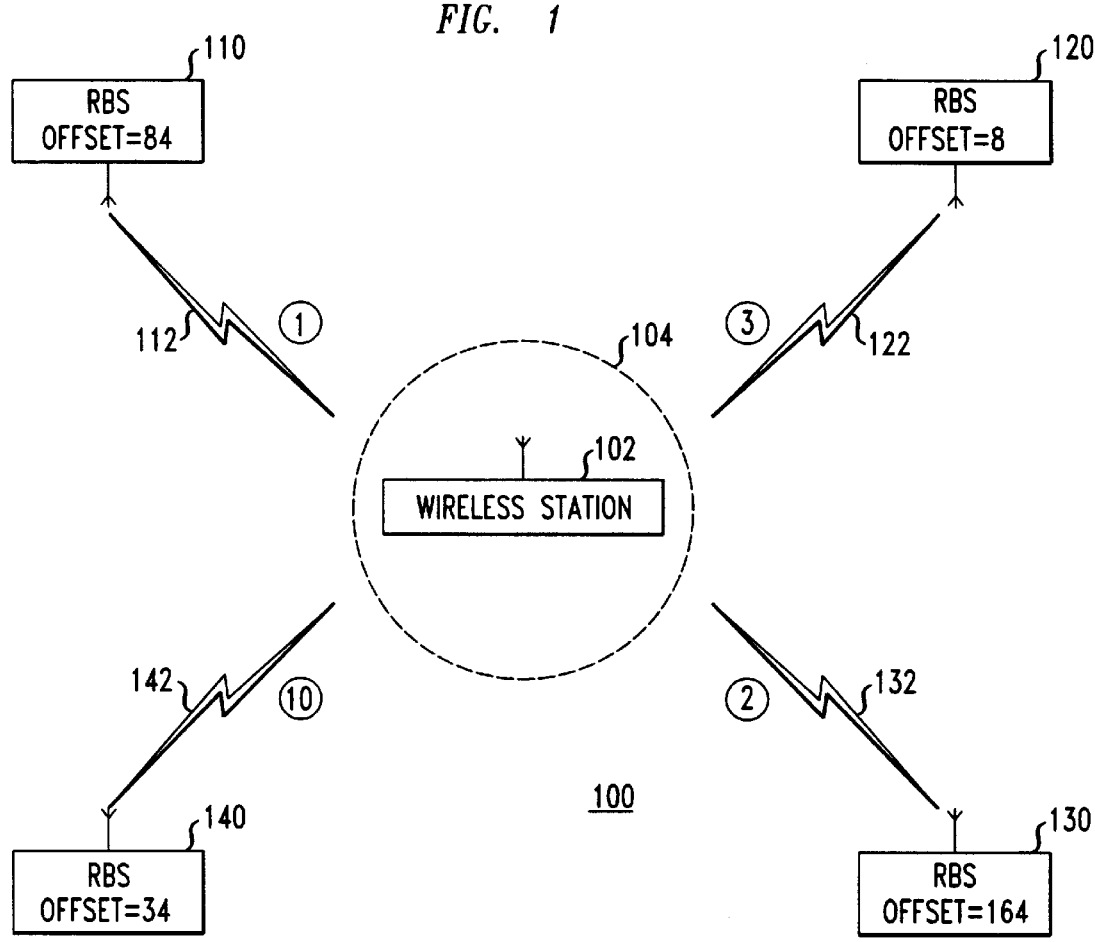
FIG. 1 shows relevant portions of a wireless communication system.

Relevant portions of a wireless communication system 100 are shown in FIG. 1 in order to illustrate the principles of the present invention. FIG. 1 shows a wireless station 102 (e.g. wireless telephone) which is located within a prescribed geographic region 140. The geographic region 104 is the area in which the wireless station 102 may operate and receive fixed wireless access service. For example, geographic area 104 may represent the geographic boundary of a subscriber's home. Thus, as described above in the background section, it is desirable to know when the wireless station 102 is operating within the prescribed geographic area 104.

FIG. 1 also shows base stations 110, 120, 130, 140, each of which communicates with the wireless station 102 via a wireless communication link 112, 122, 132, 142 respectively. In accordance with an advantageous embodiment of the invention, the wireless station 102 communicates with the base stations 110, 120, 130, 140 using the code division multiple access (CDMA) wireless communication protocol. CDMA is a transmission protocol in which the speech signal is mixed with a random-like code, and the resulting signal is transmitted over a wide band of frequencies using a spread spectrum technique. The CDMA transmission protocol is well known in the art and will not be described in detail herein.

Each base station in a CDMA system transmits a downlink pilot signal including a pseudorandom binary sequence. Each base station transmits the same pseudorandom binary sequence, but each base station transmits the sequence at a unique time offset so that each base station can be uniquely identified. More specifically, in an IS-95 CDMA system, the pilot signals are quadrature pseudorandom binary sequence signals with a period of 32,768 chips. This corresponds to a period of 26.66 ms due to the Pseudorandom Noise (PN) sequence chip rate of 1.2288 Mcps. The unique time offsets of the base stations are in increments of 64 chips providing 511 unique offsets. As used herein, when referring to a base station's unique offset, reference is made to one of the 511 unique offsets. Thus, reference to a base station's offset of 10 is actually an offset of 640(64×10=640) chips. One skilled in the art would recognize that the principles of the present invention could be implemented in a system which has different chip rates.

Referring to FIG. 1, base station 110 transmits its pseudorandom binary sequence at an offset of 84, base station 120 transmits its pseudorandom binary sequence at an offset of 8, base station 130 transmits its pseudorandom binary sequence at an offset of 164, and base station 140 transmits its pseudorandom binary sequence at an offset of 34.

The receipt of the pilot signal at the wireless station will be delayed due to propagation delay. As illustrated in FIG. 1, the propagation delay of the pilot signal from base station 110 to mobile station 102 is 1 chip, the propagation delay of the pilot signal from base station 120 to mobile station 102 is 3 chips, the propagation delay of the pilot signal from base station 130 to mobile station 102 is 2 chips, and the propagation delay of the pilot signal from base station 140 to mobile station 102 is 10 chips. As described in further detail below, the present invention uses this information to determine whether the wireless station 102 is within the prescribed geographic area 104.

Figure 2:
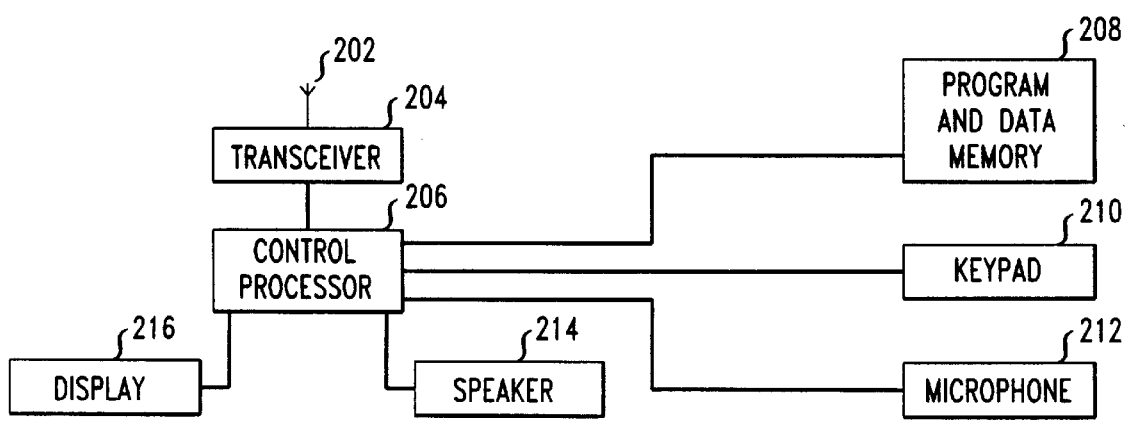
FIG. 2 shows a block diagram of the components of a wireless station configured in accordance with the present invention.

FIG. 2 shows a block diagram of the components of wireless station 102 configured in accordance with the present invention. Wireless station 102 includes a transceiver 204 which sends and receives signals from antenna 202. The overall functioning of the wireless station 102 is controlled by a control processor 206 which operates by executing computer program instructions which are stored in program and data memory 208. It is these program instructions which define the overall operation of the wireless station 102. Program and data memory 208 also stores other data which is necessary for the operation of the wireless station 102, such as user preferences, user telephone number, communication provider identification, and wireless station identification. In addition, program and data memory 208 has at least a portion of which is non-volatile, such that the information contained therein remains after power to the wireless station 102 is turned off. Although FIG. 2 shows program and data memory 208 as one component, it would be recognized by one skilled in the art that program and data memory 208 would likely be implemented with separate memory units.

Wireless station 102 also includes a keypad 210 to allow a user to communicate with control processor 206. Sound information to be transmitted by the wireless station 102 is received via microphone 212 and sound information received by the wireless station 102 is played to the user via speaker 214. The wireless station 102 also includes a display 216 to allow the control processor 206 to display alphanumeric data to the user. It is to be understood that the block diagram is for illustrative purposes only. The design and operation of wireless stations are well known in the art and various modifications are possible.

Figure 3:
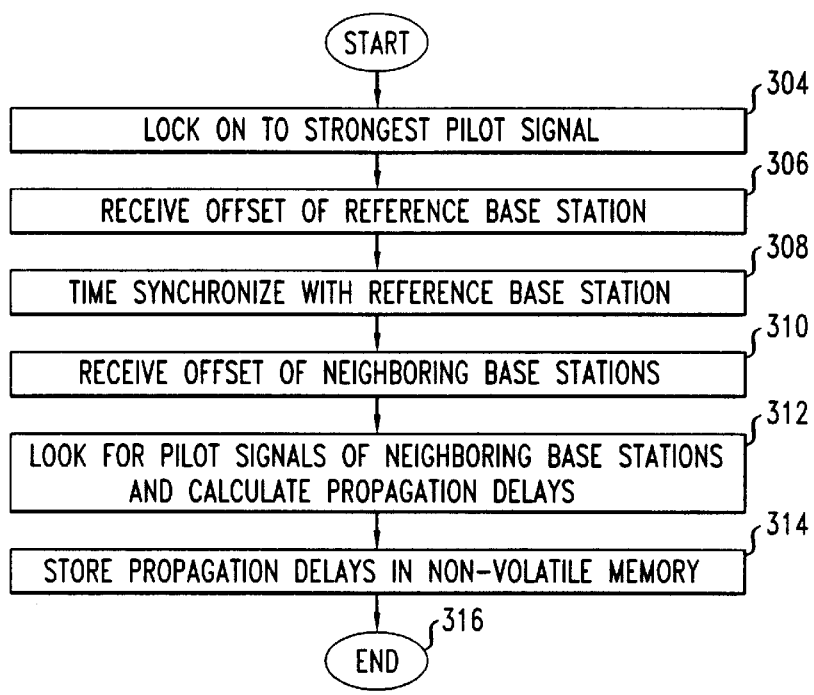
FIG. 3 is flowchart showing the steps performed by the wireless station during the initialization process.
Figure 4:
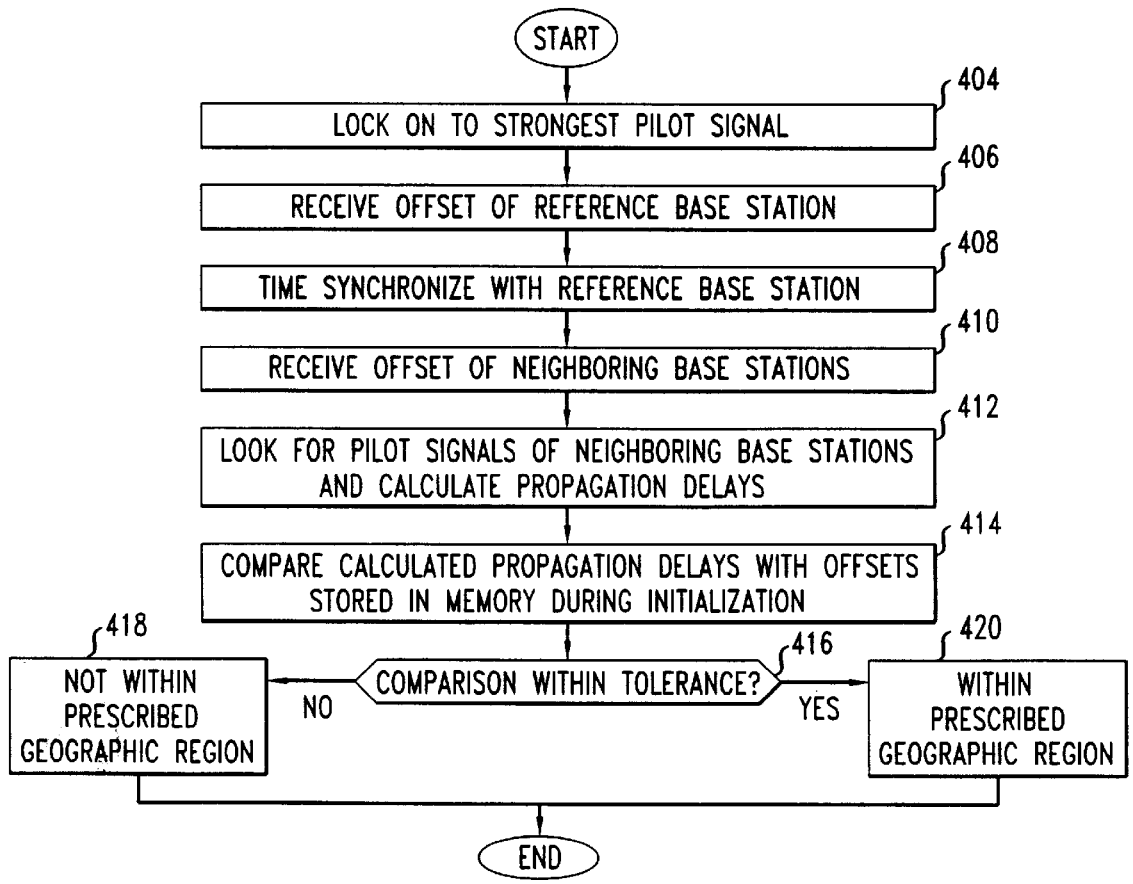
FIG. 4 is flowchart showing the steps performed by the wireless station during the check process.

The steps performed by the wireless station 102 in accordance with the present invention will be describe in conjunction with the flowcharts of FIGS. 3 and 4. These steps are performed under control of the control processor 206 executing computer program instructions which are stored in program and data memory 208. In accordance with the invention, a wireless station determines whether it is operating within a prescribed geographic region by first taking certain measurements within the prescribed geographic region and storing certain values in the memory of the wireless station. These steps are referred to as the initialization process, and are shown in the flowchart of FIG. 3. Thereafter, when the wireless station desires to obtain service, or periodically, the wireless station takes certain measurements and compares these measurements with the values stored during the initialization process. These steps are referred to as the check process, and are shown in the flowchart of FIG. 4. The steps of the flowcharts of FIGS. 3 and 4 will be described in conjunction with the example wireless station 102 and base stations 110, 120, 130, 140 shown in FIG. 1.

Referring now to the flowchart of FIG. 3, the steps of the initialization process will be described. In step 304, the wireless station 102 receives pilot signals from nearby base stations 110, 120, 130, 140 and locks onto the strongest pilot signal. Assume for purposes of this description that the strongest pilot signal is received from base station 140 and that wireless station 102 locks onto this pilot signal. Base station 140 is referred to as the reference base station. In step 306 the wireless station 102 receives the offset of the pseudorandom binary sequence transmitted by base station 140. This offset is included as part of the pilot signal transmitted by reference base station 140. As shown in FIG. 1, the offset of base station 140 is 34 (i.e. 34×64=2176 chips). Therefore, base station 140 transmits its pseudorandom binary sequence at 2176 chips after a zero reference time. Upon receiving this information, the wireless station 102 synchronizes its operations with that of base station 140 in step 308. Knowing the base station's offset and by noting the time of receipt of the base station's pseudorandom binary sequence, the wireless station 102 can determine the zero reference time. However, it is to be noted that there is a propagation delay of the signal from base station 140 to wireless station 102. That propagation delay is shown in FIG. 1 as 10 chips. The synchronization of wireless station 102 is therefore behind by 10 chips. As a result, when the wireless station 102 calculates the propagation delays of the pilot signals of the other base stations, the calculations will be off by 10 chips. All future propagation delay computations made by wireless station 102 are therefore based on the offset received from the reference base station and the actual propagation delay of the pilot signal from the reference base station.

Referring again to FIG. 3, in step 310 the wireless station 102 receives the pseudorandom binary sequence offsets of base stations which are neighbors to reference base station 140. This information is provided to wireless station 102 via the pilot signal transmitted by reference base station 140. In the example shown in FIG. 1, assume that the pilot signal of reference base station 140 identifies the offsets of neighboring base stations 110, 120, and 130 as 84, 8, and 164 respectively. Now knowing the pseudorandom binary sequence offsets of the neighboring base stations, in step 312 wireless station 102 looks for these pilot signals and calculates the propagation delays of the pilot signals. When looking for a pseudorandom binary sequence with an offset, the wireless station 102 will look in a time window for the pseudorandom binary sequence. If the pseudorandom binary sequence is found within that time window, the wireless station 102 assumes that the signal is coming from the identified neighboring base station. Thus, the time window is chosen so that it is large enough to compensate for propagation delays of the signal, but not so large that it could run into the time that the pseudorandom binary sequence is transmitted by some other base stations. The size of this time window is determined as a function of cell coverage radii and the reuse of the pilot offsets. The pilot offset of one cell can be reused in other cells. However, in a properly engineered system, such other cells will be sufficiently distant from the one cell such that the pilot signals from these other cells would be too weak to cause any problems in the one cell.

It is also noted here that all measurements taken by the wireless station are skewed by the propagation delay of the pilot signal transmitted by the reference base station. Consider the example shown in FIG. 1. Assume that base station 110 is identified as a neighboring base station with an offset of 84, or 5376(84×64) chips from the 0 reference time. Since there is a propagation delay of 1 chip from the base station 110 to wireless station 104, wireless station 104 will actually receive the pilot signal 1 chip after offset 84. However, since the synchronization of wireless station 102 is off by 10 chips as described above, wireless station 102 will think that it received the pilot signal from base station 110 nine chips early, i.e., having a propagation delay of −9 chips. Thus, as can be seen from the example, since the reference base station is used to synchronize the wireless station, any further propagation delay computations made by the wireless station will be determined with reference to the propagation delay of the pilot signal transmitted by the reference base station.

Returning now to step 312 of FIG. 3, the propagation delay of base station 110 is computed to be −9. In a similar manner, the propagation delay of base station 120 is computed to be −7, and the propagation delay of base station 130 is computed to be −8. The propagation delay of base station 140 is 0, since base station 140 is the reference base station. In step 314 these propagation delays are stored in a table in a non-volatile portion of memory 208 (FIG. 2) of the wireless station 102. Such a table is shown below as table 1.

TABLE 1

| Base Station | Computed Propagation Delay |
| --- | --- |
| 110 | −9 |
| 120 | −7 |
| 130 | −8 |
| 140 | 0 |

The initialization process ends in step 316. It is noted that these initialization steps are performed when it is desired to initialize the prescribed geographic area of the wireless station 102. For example, these steps may be performed during an initial use of the wireless station 102 within the prescribed geographic area. Alternatively, these steps may be performed periodically to reset the prescribed geographic area of the wireless station 102. In accordance with the example being described herein, the information stored in Table 1 defines the prescribed geographic area of wireless station 102 as area 104 (FIG. 1).

In accordance with the invention, the information stored in Table 1 is used to determine whether the wireless station 102 is operating within the prescribed geographic area 104 when it desires to obtain service from the wireless communication system 100. The steps to be performed by the wireless station 102 prior to obtaining service are referred to as the check process and are shown in FIG. 4. Steps 404 through 412 are the same steps as steps 304 through 312 as described above in connection with FIG. 3. After performing step 412, the mobile station will have a table, similar to table 1, stored in memory 208, with the newly computed propagation delays for the neighbor base stations. For example, assume that the wireless station locked on to base station 140 as the reference base station, and the computation of propagation delays during the check process results in the following table 2:

TABLE 2

| Base Station | Computed Propagation Delay |
| --- | --- |
| 110 | −9 |
| 120 | −7 |
| 130 | −8 |
| 140 | 0 |

Note that this table 2 contains the same values as table 1. In step 414 (FIG. 4) the wireless station 102 compares the propagation delays calculated in step 412 with the propagation delays stored in the memory 208 of the wireless station 102. This comparison step is performed by comparing the difference of the propagation delays of pairs of base stations. For example, consider the base station pair of base station 110 and base station 120. Referring to table 1, the difference in the propagation delays for this pair of base stations is −2(−9−(−7)). Similarly, the difference in the propagation delays for the pair of base stations 110 and 130 is −1, and the difference in the propagation delays for the pair of base stations 120 and 130 is 1. Of course, the differences in the propagation delays for these pairs will be the same for the information in table 2. Since all values are the same, the comparison will be within the required tolerance, and the test in step 416 will be YES, and control will pass to step 420 where it is determined that the wireless station is operating within the prescribed geographic region. The service provider can then take appropriate steps, such as providing service to the wireless station 102. If the test in step 416 is NO, then in step 418 it is determined that the wireless station is not operating within the prescribed geographic region. The service provider can then take appropriate steps, such as denying service to the wireless station 102. For example, upon execution of step 418, the wireless station 102 could prohibit calls originating or terminating at the wireless station. Further, if the steps of the check process are performed periodically, the wireless station could drop an existing call if the wireless station 102 has moved outside the prescribed geographic area.

It is possible that the wireless station 102 will be operating within the prescribed geographic location 104, but the calculated propagation delays from step 412 will be slightly different from those stored in memory as table 1. One reason for a difference in calculated propagation delays is changes in environmental conditions resulting in changes in multi-path fading and/or signal to noise ratios. For example, assume that the calculated propagation delays from step 412 are shown below in table 3:

TABLE 3

| Base Station | Computed Propagation Delay |
|---|---|
| 110 | −9 |
| 120 | −6 |
| 130 | −8 |
| 140 | 0 |

In this case, the difference in the propagation delays for the base station pairs during both the check process and the initialization process are shown below in table 4. In the table, the first column shows the base station pair being considered. The second column shows the propagation delays calculated during the check process. The third column shows the propagation delays calculated during the initialization process. The fourth column shows the difference between the propagation delay during the check process and the initialization process.

TABLE 4

| Base Station Pair | Propagation Delays Calculated During Check Process | Propagation Delays Calculated During Initialization Process | Difference Between Propagation Delay During Check Process and Initialization Process |
|---|---|---|---|
| 110, 120 | −3 | −2 | 1 |
| 110, 130 | −1 | −1 | 0 |
| 110, 140 | −9 | −9 | 0 |
| 120, 130 | 2 | 1 | 1 |
| 120, 140 | −6 | −7 | 0 |
| 130, 140 | −8 | −8 | 0 |

Thus, although the wireless station 102 is still operating within the prescribed geographic area 104, the measured propagation delays calculated during the check process are somewhat different than those stored during initialization of the wireless telephone 102. It is for this reason that the test in step 416 will compare the delays to determine whether they are within some predetermined tolerance. For example, if the tolerance were set to allow a deviation of up to 1 chip for any two of the base station pairs, then the measurements illustrated above in Table 4 would pass the test in step 416. The tolerance will be set by the service provider taking into account the operating environment of the wireless station 102.

It is noted that even though the wireless station 102 may be operating within the prescribed geographic area 104, each time the wireless station 102 performs step 404, i.e. locking on to the strongest pilot signal during the check process, it may lock on to the pilot signal of a different base station. For example during a particular operating session, the wireless station may lock on to base station 110. In such a case, base station 110 will be the reference base station and the computed propagation delays computed in step 412 will be as shown below in Table 5.

TABLE 5

| Base Station | Computed Propagation Delay |
|---|---|
| 110 | 0 |
| 120 | 2 |
| 130 | 1 |
| 140 | 9 |

Proceeding on to step 414, the wireless station 102 compares the propagation delays calculated in step 412 during the check process with the propagation delays stored in the memory 208 of the wireless station 102 during the initialization process. As described above, this comparison step is performed by comparing the difference of the propagation delays of pairs of base stations. Table 6 shown below illustrates the comparison:

TABLE 6

| Base Station Pair | Propagation Delays Calculated During Check Process | Propagation Delays Calculated During Initialization Process | Difference Between Propagation Delay During Check Process and Initialization Process |
|---|---|---|---|
| 110, 120 | −2 | −2 | 0 |
| 110, 130 | −1 | −1 | 0 |
| 110, 140 | −9 | −9 | 0 |
| 120, 130 | 1 | 1 | 0 |
| 120, 140 | −7 | −7 | 0 |
| 130, 140 | −8 | −8 | 0 |

Since all the differences are 0, the test in step 416 will be YES and control will pass to step 420 and it is determined that the wireless station 102 is within the prescribed geographic region 104. Thus, it can be seen that although the reference base station has changed from 140 during the initialization process, to 110 during the check process, the inventive technique will still determine whether the wireless station 102 is operating within the prescribed geographic area 104 because the comparison of step 416 tests the difference in propagation delay of base station pairs.

In accordance with another embodiment, the inventive technique could be used to determine whether the mobile station 102 is within one of a plurality of prescribed geographic regions. In such an embodiment, the initialization process of FIG. 3 is repeated while the wireless station 102 is present in each of the prescribed geographic areas and the propagation delays calculated in each area are stored in separate tables in non-volatile memory. Thereafter, during the check process of FIG. 4, steps 414 through 420 will be repeated for each such table stored in non-volatile memory. If the test in step 416 is YES for any of the tables, it is determined that the wireless station 102 is operating within the prescribed geographic area associated with that table.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing form the scope and spirit of the invention.

We claim:

1. A method for determining whether a mobile station is operating within a prescribed geographic region comprising the steps of:
   receiving pilot signals from a plurality of base stations;
   computing time delays between an expected time of receipt and actual time of receipt of said pilot signals from at least two of said base stations at said mobile station;
   comparing said computed time delays with prestored time delays; and
   determining that said mobile station is operating within said prescribed geographic region if said computed time delays are within a predetermined tolerance of said prestored time delays.

2. The method of claim 1 wherein said expected times of receipt of said pilot signals are determined with reference to the pilot signal received from a chosen one of said base stations.

3. The method of claim 1 wherein said step of comparing further comprises the step of comparing the differences between the time delays of pilot signals of pairs of base stations.

4. The method of claim 1 wherein said prestored time delays comprise sets of time delays and wherein each of said sets of time delays is associated with one of a plurality of prescribed geographic regions, and wherein:
   said step of comparing further comprises the step of comparing said computed time delays with said sets of prestored time delays; and
   said step of determining further comprises the step of determining that said mobile station is operating within one of said plurality of prescribed geographic region if said computed time delays are within a predetermined tolerance of a set of prestored time delays associated with said one of said plurality of prescribed geographic regions.

5. The method of claim 1 further comprising the step of:
   determining that said mobile station is not operating within said prescribed geographic region if said computed time delays are not within a predetermined tolerance of said prestored time delays; and
   denying service to said mobile station.

6. The method of claim 5 wherein said steps of comparing and determining are performed periodically during an existing call and wherein said step of denying service further comprises the step of:
   dropping said existing call.

7. A method for determining whether a mobile station is operating within a prescribed geographic region comprising the steps of:
   during an initialization session wherein said mobile station is operating within said prescribed geographic region:
      receiving pilot signals from a plurality of base stations;
      computing time delays between an expected time of receipt and actual time of receipt of said pilot signals from at least two of said base stations at said mobile station;
      storing said computed time delays in a memory of said mobile station; and
   during a check session subsequent to said initialization session:
      receiving pilot signals from a plurality of base stations;
      computing time delays between an expected time of receipt and actual time of receipt of said pilot signals from at least two of said base stations at said mobile station;
      comparing:
         a) the differences between the time delays of pilot signals of pairs of base stations computed during the check session; with
         b) the differences between the stored time delays of pilot signals of pairs of base stations computed during the initialization session; and
      determining that said mobile station is operating within a prescribed geographic region if results of said comparing step are within a predetermined tolerance.

8. The method of claim 7 wherein said expected times of receipt of said pilot signals are determined with reference to the pilot signal received from a chosen one of said base stations.

9. The method of claim 8 wherein said chosen one of said base stations is the same during said initialization session and said check session.

10. The method of claim 8 wherein said chosen one of said base stations is different during said initialization session and said check session.

11. The method of claim 7 further comprising the step of:
    determining that said mobile station is not operating within said prescribed geographic region if results of said comparing step are not within a predetermined tolerance; and
    denying service to said mobile station.

12. The method of claim 11 wherein said steps of said check session are performed periodically during an existing call and wherein said step of denying service further comprises the step of:
    dropping said existing call.

13. A mobile station comprising:
    a receiver for receiving pilot signals from a plurality of base stations;
    means for computing time delays between an expected time of receipt and actual time of receipt of said pilot signals from at least two of said base stations at said mobile station;
    a memory for storing reference time delays;
    means for comparing said computed time delays with said stored reference time delays; and
    means for determining that said mobile station is operating within a prescribed geographic region if said computed time delays are within a predetermined tolerance of said stored reference time delays.

14. The mobile station of claim 13 wherein:
    said reference time delays are stored as sets of time delays, each of said sets being associated with one of a plurality of prescribed geographic regions.

15. The mobile station of claim 14 wherein:
    said means for comparing further comprises means for comparing said computed time delays with said sets of time delays; and
    said means for determining further comprises means for determining that said mobile station is operating within one of said plurality of prescribed geographic regions if said computed time delays are within a predetermined tolerance of the stored reference time delays associated with said one of said plurality of prescribed geographic regions.

16. The mobile station of claim 13 further comprising:

means for determining that said mobile station is not operating within said prescribed geographic region if said computed time delays are not within a predetermined tolerance of said stored reference time delays; and means for denying service to said mobile station.

17. The mobile station of claim 16 wherein said means for denying further comprises:

means for dropping an existing call.

* * * * *